United States Patent [19]

Nibby et al.

[11] 3,809,884

[45] May 7, 1974

[54] APPARATUS AND METHOD FOR A VARIABLE MEMORY CYCLE IN A DATA PROCESSING UNIT

[75] Inventors: Chester M. Nibby, Billerica; John C. Manton, Marlboro; John L. Curley, Sudbury, all of Mass.

[73] Assignee: Honeywell Information Systems Inc., Waltham, Mass.

[22] Filed: Nov. 15, 1972

[21] Appl. No.: 306,757

[52] U.S. Cl. ........................ 340/172.5, 340/173 DR

[51] Int. Cl. .... G06f 11/00, G06f 13/00, G11c 7/00

[58] Field of Search .................................. 340/172.5

[56] References Cited

UNITED STATES PATENTS

| | | | |
|---|---|---|---|
| 3,426,328 | 2/1969 | Gunderson et al. | 340/172.5 |
| 3,548,177 | 12/1970 | Hartlipp et al. | 235/153 |
| 3,623,017 | 11/1971 | Lowell et al. | 340/172.5 |
| 3,639,913 | 2/1972 | Watson | 340/172.5 |
| 3,656,123 | 4/1972 | Carnevale | 340/172.5 |
| 3,703,707 | 11/1972 | Bovett | 340/172.5 |

*Primary Examiner*—Paul J. Henon
*Assistant Examiner*—James D. Thomas
*Attorney, Agent, or Firm*—Ronald T. Reiling; Fred Jacob

[57] ABSTRACT

Apparatus and method for providing a variable memory cycle in a memory module connected to a data processing unit. The operation being performed in the memory module causes a clock to establish a memory cycle interval determined by the particular memory module operation. The memory module is inaccessible to the data processing unit only for a period of time necessary for completion of the operation.

20 Claims, 5 Drawing Figures

APPARATUS AND METHOD FOR A VARIABLE MEMORY CYCLE IN A DATA PROCESSING UNIT

BACKGROUND OF THE INVENTION

1. Field of the Invention

This invention relates generally to a data processing unit and more particularly to the interaction of a memory module with a central processing unit of the data processing unit. The cycle time of the memory, during which the memory module is made unavailable for manipulation by the central processing unit, depends on the specific operation performed by the memory and therefore occupies a variable interval.

2. Description of the Prior Art

In a data processing unit, information (typically in the form of binary data bits), required by the central processor is stored in and retrieved from one or more memory modules. However, the interval necessary for completion of an operation by the memory module can depend upon the particular memory operation. For example, error correcting code (ECC) equipment is frequently employed with metal-oxide-semiconductor (MOS) memory element arrays to minimize the deleterious effects of spurious errors on the information integrity. (The method and implementation of error-correcting code is discussed in Error-Correcting Codes, W. Wesley Peterson and E.J. Weldon Jr. M.I.T. Press Cambridge 1972. See also Error-Correcting Codes, by W. Wesley Peterson, M.I.T. Press 1961, p. vi, third paragraph). The "masked-write" or "partial-write" operation (i.e., an operation in which a portion of a data group stored in memory array is replaced by incoming data) requires a longer interval than a normal or "full write" operation when the ECC technique is employed. Thus the interval during which the memory module is unavailable to the central processor varies as a function of the memory module operation. Furthermore, as the data groups or " words" increase in size to increase the speed of data handling of the data processing unit, the "masked-write" operation assumes more importance.

It is known in the prior art to provide a memory cycle occupying a constant interval. The interval chosen for the memory cycle is of sufficient magnitude so that the longest operation of the memory module may be accommodated within its limits, and therefore all the memory operations may be inefficient because a memory module may be unavailable to the central processor unnecessarily.

It is therefore an object of the present invention to provide an improved memory module.

It is a further object of the present invention to provide apparatus and method for varying the memory cycle of a memory module depending on the memory operation.

It is another object of the present invention to render the memory module unavailable to the central processing unit only for the period of time necessary for the performance of memory operation.

It is still another object of the present invention to provide protection for the memory module during the variable interval so that signals by memory module are rendered ineffective during that interval.

It is still another object of the present invention to prohibit access to a memory module by a central processing unit during execution of an operation occupying a variable interval in the memory module.

It is a more particular object of the present invention to provide a memory cycle occupying a first interval for a memory-read or memory-write operation, and a second memory cycle occupying a different interval for a memory "masked-write" operation. The memory module is not available to the central processing unit during either of these intervals.

It is a still more particular object of the present invention to provide a memory cycle occupying a third interval for a memory "masked-write" operation during which operation the memory module is not available to the central processing unit. The second interval is activated when no error is detected in the stored data during the "masked-write" operation while the third interval is activated when an error is detected in the stored data in the "masked-write" operation.

SUMMARY OF THE INVENTION

The aforementioned and other objects of the present invention are accomplished by a clock network which provides an operation-dependent memory cycle during which an operation in a memory module is completed. Simultaneously, the memory module is rendered unavailable to the central processing unit only for a period required for the completion of the operation.

The operation-dependent memory cycles are established by signals to the clock network from the central processing unit and/or the memory module itself. The clock network further signals to the central processing unit that the memory module is unavailable, while disabling the input channels of the clocking network for the period of the operation.

These and other features of the invention will be understood upon the following description together with the drawings.

DESCRIPTION OF THE PREFERRED EMBODIMENT

DETAILED DESCRIPTION OF THE FIGURES

Figure 1:
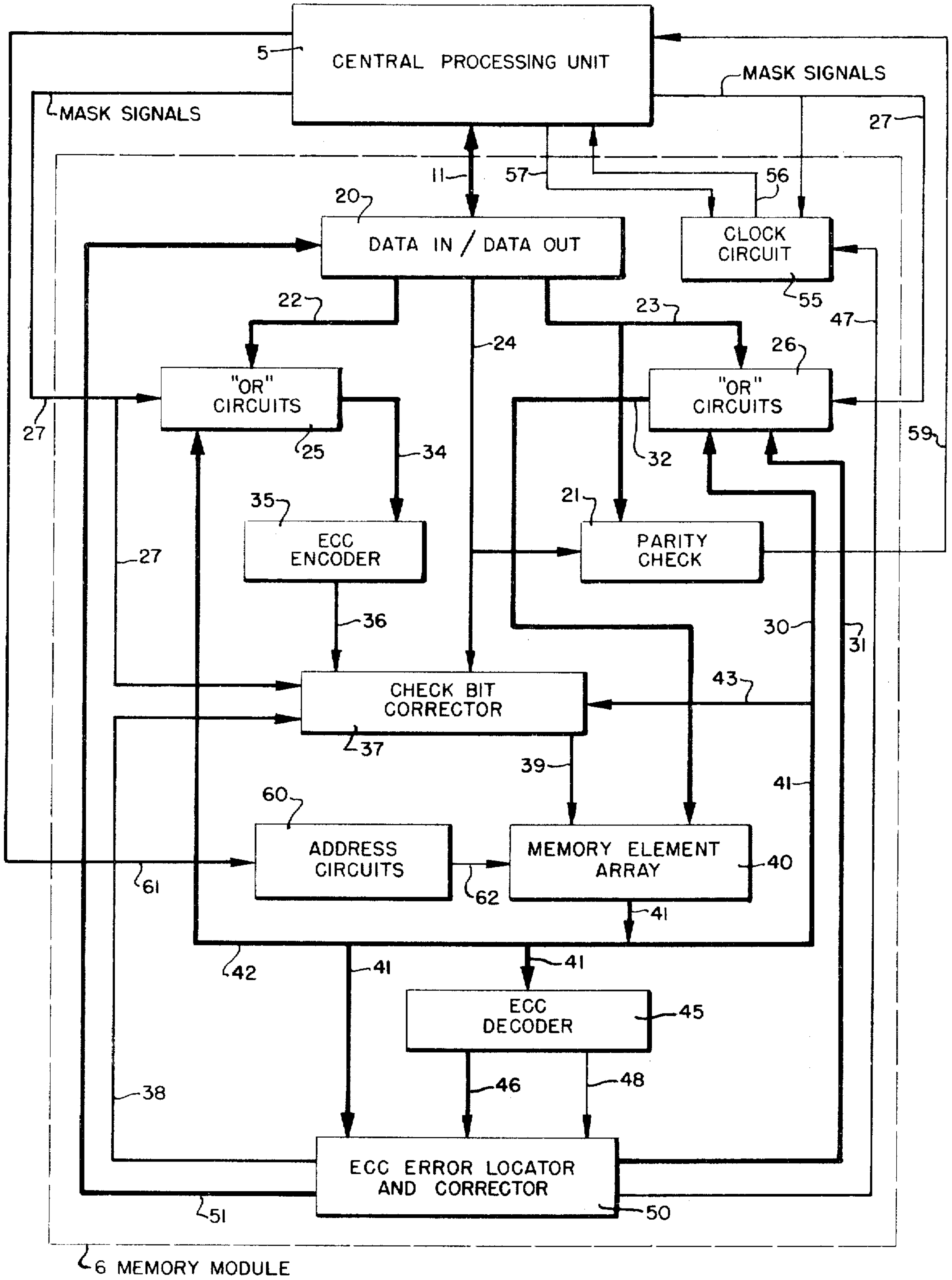
FIG. 1 is a schematic block diagram of the apparatus of the memory module related to the present invention.

Referring to FIG. 1, the apparatus necessary to produce a write-operation, a read-operation or a "masked-write" operation for Memory Module 6 are shown. Data, in the form of a group of digital binary signals are delivered from a Central Processing Unit 5 to Memory Module 6 via Main Data Channel 11. In the preferred embodiment, more than one Memory Module 6 can be coupled to Main Data Channel 11, but the present invention can be understood by considering one Memory Module 6.

In the preferred embodiment, the data "word," carried by the Main Data Channel 11, is arranged in eight bytes, each byte comprised of eight data bits plus one parity bit. However, other arrangements of binary signal bits may be used. The contents of the Main Data Channel 11 are delivered to Data In/Data Out Register 20. The data-in bits are applied to logic "OR" Circuits 25 via Bus 22. The binary signals of logic "OR" Circuits 25 are delivered to ECC Encoder 35 via Bus 34. ECC Encoder 35 computes eight check bits (to replace the parity bits) from the data bits and delivers the check bits to Check Bit Corrector 37. Check Bit Corrector 37 delivers check bits to Memory Element Array 40 on Bus 39.

The Data In/Data Out Register 20 applies the data bits to logic "OR" Circuits 26 and to Parity Check Circuit 21 via Bus 23. Data bits in "OR" Circuits 26 are applied to Memory Element Array 40 via Bus 32.

The parity bits of the Data In/Data Out Register 20 are applied to Check Bit Corrector 37 and Parity Check Circuit 21 via Bus 24. The Parity Check Circuit 21 computes the parity of the data bytes and compares the result with the parity bits accompanying the data "word." Any discrepancy is signaled to the Central Processing Unit 5 via Bus 59.

The data bits and check bits of the Memory Element Array 40 are applied to an ECC Decoder 45 and an ECC Error Locator and Corrector 50 via Bus 41. ECC Decoder 45 recomputes the check bits from the data bits and then compares the recomputed check bits with the check bits stored in Memory Element Array 40. On the basis of this comparison, the syndrome bits, which specify the location of the error causing the discrepancy, are calculated in the ECC Decoder 45. A discrepancy between the two sets of check bits is also signaled via Bus 47, to Clock Circuit 55 as an error. The syndrome bits are delivered to ECC Error Locator and Corrector 50 via bus 46. The ECC Decoder 45 also calculates the data byte parity and the parity signals are delivered to ECC Error Corrector 50 via Bus 48. The syndrome bits are analyzed in ECC Corrector 50 and specify the location of the bit in which an error has appeared. The result of this analysis is a set of check bit error signals.

The data bits from Memory Element Array 40 are delivered to logic "OR" Circuits 26 via Bus 30 and to logic "OR" Circuits 25 via Bus 42. The parity bits from Memory Element Array 40 are delivered to Check Bit Corrector 37 via Bus 43 when the ECC mode is not activated.

Corrected data bits are delivered via Bus 31 from ECC Error Corrector 50 to logic "OR" Circuits 26. The check bit error signals are delivered from ECC Error Corrector 50 to Check Bit Corrector 37 via Bus 38 and used to correct the check bits stored in Corrector 37. The corrected data and byte parity are delivered from the ECC Error Corrector 50 to Data In/Data Out Register 20 via Bus 51. The corrected information can be applied to Main Data Channel 11 for delivery to Central Processing Unit 5.

Central Processing Unit 5 produces mask-signals which are applied to "OR" Circuits 25, "OR" Circuit 26 and Check Bit Corrector 37. The mask-signals specify the bytes to be retained and the bytes to be replaced in the data "word" stored in Memory Element Array 40.

Central Processing Unit 5 also produces signals identifying an address in Memory Element Array 40 with which an operation of Memory Module 6 will be concerned. The address is delivered to Address Circuits 60 via Bus 61 and subsequently to Memory Element Array 40.

Clock Circuit 55 is coupled to Central Processing Unit via Bus 56 and Bus 57. Clock Circuit 55 also receives the mask-signals from Central Processing Unit 5.

The encoding and decoding of error-correction codes, the calculation of parity bits and syndrome bits, and the correction of data as performed by ECC Encoder 35, Check Bit Corrector 37, ECC Decoder 45, and ECC Error Locator and Corrector 50 is well-known in the art. See, for example, U.S. Pat. No. 3,573,728 issued to Kolankowsky on Apr. 6, 1971.

Figure 2:
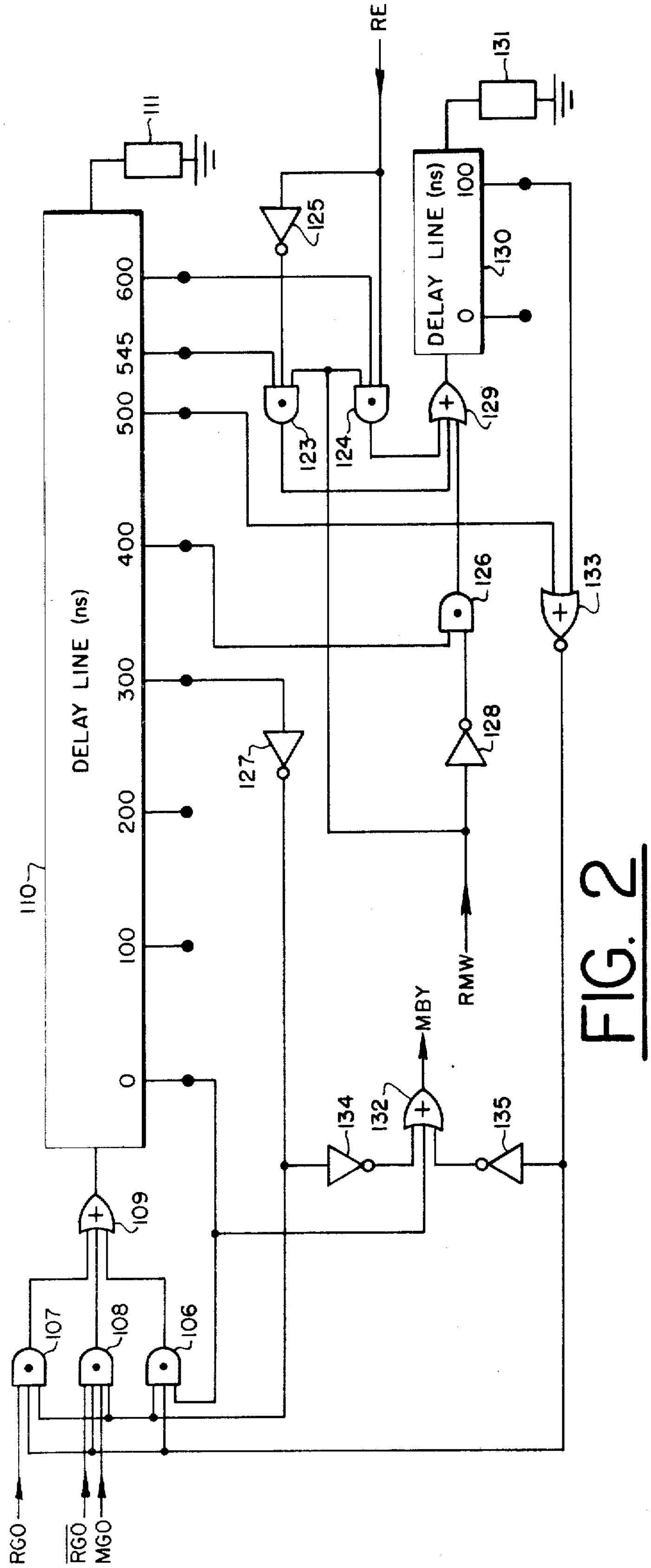
FIG. 2 is a logical block diagram of the clock network according to the preferred embodiment.

Referring next to FIG. 2, the Clock Circuit, according to the preferred embodiment, is shown. The Clock Circuit 55 is comprised of Delay Line 110 terminated by Impedance 111 and Delay Line 130, terminated by Impedance 131. The input terminal of Delay Line 110 is coupled to an output terminal of Logic "OR" gate 109. The input terminals of Logic "OR" gate 109 are coupled to output terminal of logic "AND" gate 107, logic "AND" gate 108 and logic "AND" gate 106, respectively.

The input terminals of logic "AND" gate 107 are coupled to a RGO (Refresh G*o*) signal terminal, an output terminal of Inverting Amplifier 127 and an output terminal of logic "NOR" (negative "OR") gate 133, respectively. The input terminals of logic "AND" gate 108 are coupled to a $\overline{\text{RGO}}$ signal terminal, a MGO (Memory Go) signal terminal, the output terminal of Inverter 127 and the output terminal of logic "NOR" gate 133, respectively. The input terminals of logic "AND" gate 106 are coupled to a 0 ns terminal of Delay Line 110, the output terminal of Inverter 127 and the output terminal of logic "NOR" gate 133. The input terminal of Inverter 127 is coupled to a 300 ns terminal of Delay Line 110. The output terminals of Inverter 127 and "NOR" gate 133 are initially a positive logic signal. Thus, either an RGO or a combination of $\overline{\text{RGO}}$ and MGO produce a signal in Delay Line 110. The coupling of the 0 ns terminal and the "AND" gate 106 provides a recirculation path or "latch," maintaining a positive signal at the input terminal of Delay Line 110. The latch is broken after 300 ns when Inverter 127, in response to the position signal at the 300 ns terminal of the Delay Line 110, disables "AND" gate 106, as well as "AND" gate 107 and "AND" gate 108. Thus a 300 ns wide positive pulse is propagated along of Delay Line 110, after the original enabling signals. RGO and $\overline{\text{RGO}}$ can be generated in either Central Processing Unit 5 or Memory Element Array 40 and are used to control the refreshing of the MOS memory.

The 400 ns terminal of Delay Line 110 is coupled to an input terminal of logic "AND" gate 126. A second input terminal of "AND" gate 126 is coupled through Inverting Amplifier 128 to the RMW (Read Modify Write) signal. Thus, after 400 ns, a positive logic signal, lasting 300 ns, will appear at the output terminal of "AND" gate 126 if RMW is a zero logic signal. The output terminal of "AND" gate 126 is coupled to an input terminal of logic "OR" gate 129.

A 500 ns terminal of Delay Line 110 is coupled to an input terminal of "NOR" gate 133, thereby disabling "AND" gates 107, 108, and 106 for 300 ns beginning 500 ns after a positive signal is applied to the input terminals of Delay Line 110.

One input terminal of logic "AND" gate 123 is coupled to a 545 ns terminal of Delay Line 110, while one input terminal of logic "AND" gate 124 is coupled to a 600 ns terminal of Delay Line 110. A second input terminal of "AND" gate 124 is coupled to an RE (Read Error) signal, while a second input terminal of "AND" gate 123 is coupled through Inverting Amplifier 125, to the RE signal. The RE signal is delivered from ECC Error Locator and Corrector 50 when the computed ECC check bits differ from the ECC check bits stored in memory. An output terminal of "AND" gate 123 and an output terminal of "AND" gate 124 are coupled to input terminals of logic "OR" gate 129. An output terminal of "OR" gate 129 is coupled to an input terminal of Delay Line 130. The 100 ns terminal of Delay Line 130 is coupled to a second input terminal of "NOR" gate 133. If RMW is a zero logic signal, the output terminal "NOR" gate 133 is a zero logic signal, due to signals from Delay Line 130, for 300 ns beginning 500 ns after a positive signal is applied to Delay Line 110. If RMW is a positive logic signal and RE is a zero logic signal, then the output terminal of "NOR" gate 133 is a zero logic signal due to signals from Delay Line 130, for 300 ns beginning 645 ns after a positive signal is applied to the input terminal of Delay Line 110. If RMW is a positive logic signal and RE is a positive logic signal, then the output terminal of "NOR" gate 133 is a zero logic signal due to signals from Delay Line 130, for 300 ns beginning 700 ns after a positive logic signal is applied to the input terminal of Delay Line 110.

The input terminals of logic "OR" gate 132 are coupled to the 0 ns terminal of Delay Line 110, to the output terminal of Inverter 127 through Inverting Amplifier 134 and to the output terminal of "NOR" gate 133 through Inverting Amplifier 135, respectively. The output terminal of "OR" gate 132 is an MBY (Memory Module Busy) signal.

Other periods of time can be used without departing from the spirit and scope of this invention. The discussion above, for purposes of simplicity of description, assumes no time delay occurs in the logic elements. The effect of the logic element time delays will be apparent to one skilled in the art.

Figure 3A:
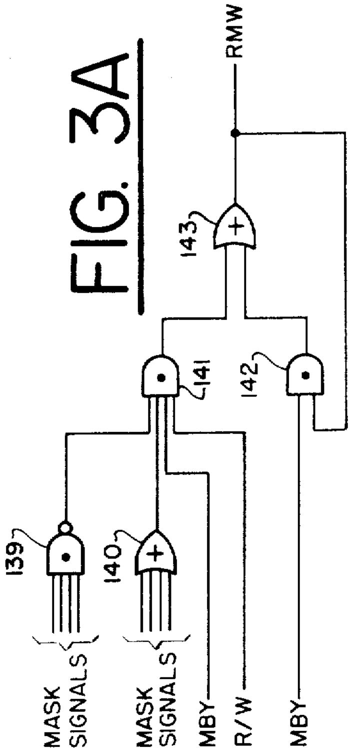
FIG. 3A and FIG. 3B are logic block diagrams of recirculation circuits providing signals for activation of the clock network.

Referring next to FIG. 3, the origin of signals of Clock Circuit 55 are shown. In FIG. 3A, the RMW signal is taken from an output terminal of logic "OR" gate 143. An output terminal of logic "AND" gate 141 is coupled to an input terminal of "OR" gate 143 while an output terminal of logic "AND" gate 142 is coupled to a second terminal of "OR" gate 143. One input terminal of logic "AND" gate 142 is coupled to the output terminal of "OR" gate 143, providing a latching or recirculation of a positive logic signal. A second input terminal of "AND" gate 142 is coupled to the MBY (Memory Busy) signal. The MBy signal may be delayed to allow for "setting" of the logic circuits. One input terminal of "AND" gate 141 is coupled to the MBY signal, a second input terminal of "AND" gate 141 is coupled to an output terminal of logic "OR" gate 140, a third input terminal is coupled to the output of logic "NAND" gate 139, and a fourth input terminal is coupled to a R/W (Read Write) signal from the Central Processing Unit. The input terminals of "OR" gate 140 and "NAND" gate 139 are coupled to mask-signals, produced by the Central Processing Unit 5 so that the RMW signal is produced when at least one, but not all mask signals are present. A RMW signal is latched (or maintained) for as long as MBY is a positive logic signal.

Figure 3B:
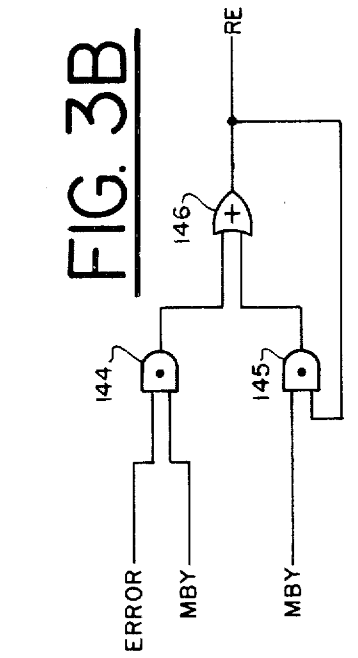

In FIG. 3B, the RE signal is taken from an output terminal of logic "OR" gate 146. An output terminal of logic "AND" gate 144 is coupled to one input terminal of "OR" gate 146 while an output terminal of logic "AND" gate 145 is coupled to a second input terminal of "OR" gate 146. An input terminal of logic "AND" gate 145 is coupled to the MBY signal, while a second terminal of "AND" gate 142 is coupled to the output terminal of "OR" gate 143 and provides the recirculation or latching pathing. An input terminal of logic "AND" gate 144 is coupled to an Error signal produced by the ECC Decoder 45, while a second input terminal of "AND" gate 144 is coupled to the MBY signal. The Error Signal can contain transient signals during the settling time and can require well known compensation techniques. The RE signal will be produced and maintained as long as MBY is a positive logic signal when an Error Signal is produced during the presence of a positive MBY signal.

Figure 4:
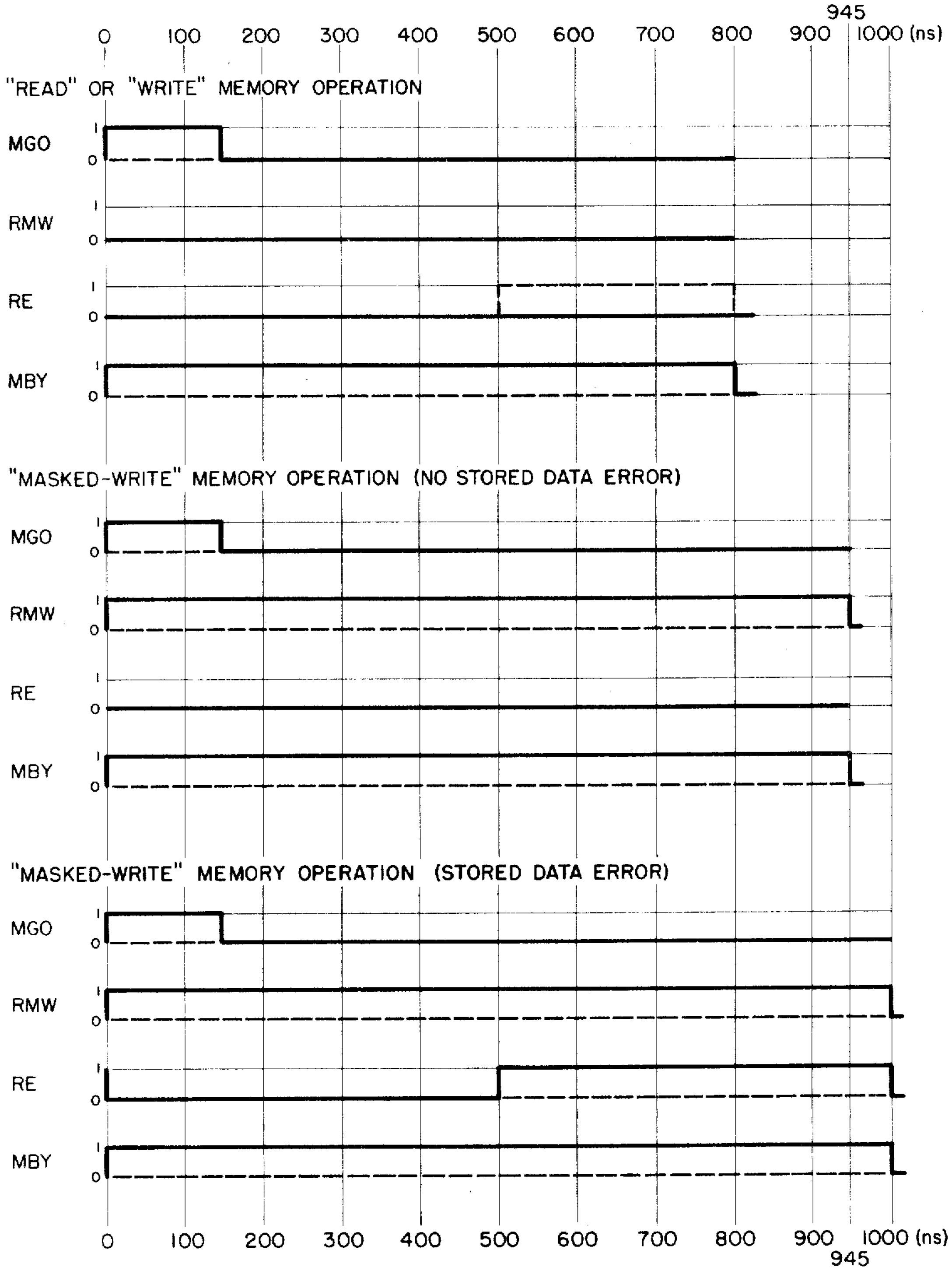
FIG. 4 illustrates timing diagrams for three time intervals according to the preferred embodiment.

Referring next to FIG. 4, timing diagrams for the Clock Circuit 55 in the presence of specified signals are shown. The MGO signal is produced in the Central Processing Unit and is less than 300 ns in duration in the preferred embodiment. The R/W signal specifies a "read" operation (by the application of a positive binary logic signal) or a "write" operation.

In an ordinary "read" or "write" operation for a Memory Module, the MGO signal is a positive logic signal for less than 300 ns of the memory operation, the RMW signal and the RE are zero logic signals for the entire (i.e., 800 ns) memory operation and MBY is a positive logic signal for the entire (i.e., 800 ns) memory operation in the "write" operation. The RE signal (shown by the dotted line) can occur in a "read" operation.

In a "Masked-Write" operation in which an error is not detected in the data of Memory Element Array 40 by ECC Decoder 45, MGO is a positive logic signal for less than 300 ns of the memory operation. The RMW is a positive logic signal for the entire (i.e., 945 ns) of the memory operation, RE is a zero logic signal for the entire memory operation and MBY is a positive logic signal for the entire Masked-Write memory operation.

In the "Masked-Write" operation in which an error is detected in the data stored in Memory Element Array 40 by ECC Decoder 45 the MGO signal is a positive logic signal for less than 300 ns, RMW and MBY are a positive logic signals for the entire duration (i.e., 1,000ns of the memory cycle, and RE is a positive logic signal for the final 500 ns of the memory operation.

OPERATION OF THE PREFERRED EMBODIMENT

In a "write" operation in the Memory Module 6, the incoming binary bits of the data "word" in Data In/-Data Out Register 20 are checked in Parity Check Circuits 21. In the absence of a parity error, the ECC check bits are encoded in ECC Encoder 35 from the "word" data bits. Then the ECC check bits and the data bits which are gated through "OR" Circuits 26 and written into the Memory Element Array 40. A major portion of time for the "write" operation is taken up by the calculation of the ECC check bits.

In a "read" operation, the data bits of a "word" from Memory Element Array 40 are encoded to produce ECC check bits in ECC Decoder 45. The calculated ECC check bits and the ECC check bits from the Memory Element Array 40 are compared and syndrome bits are generated in ECC Decoder 45. The syndrome bits for certain classes of errors, establishes the location of an error and this error is corrected in ECC Error Corrector 50. The corrected data bits and parity bits, which are calculated for each data byte of the data "word," are applied to the Data In/Data Out Register 20. Again the major portion of time is required to encode the ECC check bits and produce the syndrome bits from the data bits. Thus a "write" operation and a "read" operation occupy approximately the same time interval, 800 ns in the preferred embodiment.

In a "masked-write" operation in which a byte or bytes of a word in Memory Element Array 40 is replaced mask signals are delivered to Memory Module 6 indicating the position of the data bytes which are to remain unchanged. Logic "OR" Circuit 25, under control of the mask signals, selects the appropriate new data bytes, from Data In/Data Out Register 20, as well as the data bytes to be retained from the Memory Element Array 40 and applies the resulting data bytes to ECC Encoder 35. Similarly, the appropriate data bytes from the Data In/Data Out Register 20 and from Memory Element Array 40 are also selected under control of the mask signals in "OR" Circuits 26. Since, however, an error may be present in the data bytes from the Memory Element Array 40, ECC check bits are developed and compared with the check bits of the Word from the Memory Element Array to produce Syndrome bits in the ECC Decoder 45. If no error is found, then the modified data bits and calculated ECC check bits are written into the Memory Element Array 40. If an error is detected, the error is located and corrected in ECC Error Corrector 50. The data bit of "OR" circuits 26 is corrected correspondingly and the ECC check bits are corrected in Check Bit Corrector 37 on the basis of signals from ECC Error Corrector 37. The necessity for checking the data from Memory Element Array 40 extends the time required for the operation so that 945 ns is required for a "masked-write no read error" operation in the preferred embodiment. The presence of an error requires additional time for the location and correction of the error and in the preferred embodiment the "masked-write, read error" occupies an interval of 1,000 ns.

Clock Circuit 55 determines an operation-dependent interval for the non-availability of Memory Module 6. In the absence of an RMW signal, the Memory Module 6 will be unavailable for 800 ns. During this period a "read," "write" or "refresh" operation can be completed in the memory. The "refresh" operation is necessary for certain types of memories, such as the MOS semiconductor memories, where the physical quantity representing the binary signal must be periodically restored. During the "refresh" operation the memory elements of Memory Element Array 40 undergoing restoration are unavailable. In the preferred embodiment, this operation may be omitted or modified without departing from the scope and spirit of the present invention.

The generation of the RMW signals, caused by the presence of "mask" signals, is available as soon as the presence of the MBY signal is generated. The "mask" signals are generated by the Central Processing Unit 5 along with the address signals and the R/W signal. In the preferred embodiment, the address signals and the R/W signal precede the MGO signal and therefore the RMW signal will be generated as soon as the MBY signal is available. The RMW signal will be maintained by a latching network of FIG. 3A until MBY becomes a binary zero signal. The MBY signal will be a positive binary signal for 945 seconds, when the RMW but not the RE signal is generated during the presence of the MBY signal. During this interval, the "masked-write no read error" operation is completed.

The generation of the RE signal occurs when an error signal is generated in the ECC Error Locator and Corrector 50 and the MBY signal is a positive binary signal. The RE is latched (i.e., maintained) until the MBY signal is a zero binary signal. The error signal occurs at approximately 500 ns after the beginning of the MBY signal in the preferred embodiment. The MBY signal when the RE signal is generated is a positive binary signal for 1,000 ns. During this interval, the "masked-write read error" operation is completed in the Memory Module.

The MBY signal from Clock Circuit 55 is supplied to the Central Processing Unit 5 to signal that the Memory Module 6 is unavailable. In addition the signals which produce MBY are returned to "AND" gates 106, 107 and 108 in a manner so as to disable the input channels to Delay Line 110 for the variable period of time that MBY is a positive binary signal.

The above description is included to illustrate the operation of the preferred embodiment and is not meant to limit the scope of the invention. The scope of the invention is to be limited only by the following claims. From the above discussion, many variations be apparent to one skilled in the art that would yet be encompassed by the spirit of the scope of the invention.

What is claimed is:

1. In combination with an electronic data processing unit, a memory module comprising:

memory element means for storing data in the form of physical states or electrical states, depending on the type of memory utilized, representing logic signals;

circuit means for communicating a group of said logic signals between said memory module and said data processing unit;

first signal generating means for producing a group of error-correcting code signals from said group of logic signals, said group of code signals thereafter residing in said memory module adjacent said group of logic signals;

second signal generating means for producing error signals from a group of logic signals extracted from said memory element means, said error signals locating an error in said group of memory logic signals, said error signals found by decoding said memory logic signals and an adjacent group of code signals extracted from said memory element means;

correction means for correcting said group of memory logic signals and for correcting a new group of code signals derived from a new group of logic signals, said new group of logic signals including a portion of said group of memory logic signals, said corrected group of code signals and said corrected group of logic signals being stored in said memory element means; and timing means responsive to said second signal generating means; for preventing access to said memory module by said data processing unit for an interval of time, said interval being sufficient only for the completion of each operation occurring in said memory module.

2. The memory module of claim 1 wherein said timing means prevents access to said memory module for a first time interval during a "read" and during a "write" operation, said timing means preventing access to said memory module for a second time interval during a "partial-write" operation.

3. The memory module of claim 1, wherein said timing means includes apparatus responsive to detection of an error by said second signal generating means, said timing means preventing access to said memory module for a first time interval during a "read" and during a "write" operation, said timing means preventing access during a second time interval during a "partial-write" operation when no error is detected by said second signal generating means, and said timing means preventing access to said memory module for a third time interval during said "partial-write" operation upon said detection of an error.

4. The memory module of claim 3 wherein said timing means includes apparatus responsive to a "refresh" operation of said memory element means, said refresh operation being a restoration of said physical or electrical states representing logic signals in at least a portion of said memory element means, said timing means preventing access of said memory module by said data processing unit for said first interval during said "refresh" operation.

5. The memory module of claim 3 wherein said timing means comprises a first delay line, three gate means and a second delay line, said first delay line having three output terminals for establishing a variable portion of said first, said second and said third intervals, said second delay line establishing a constant portion of said first, said second and said third intervals, said three gate means respectively coupling said three output terminals to said second delay line, wherein activation of an appropriate one of said three gate means causes said memory module to be non-available to said data processing unit for a corresponding one of said three intervals.

6. The memory module of claim 5, wherein said timing means is responsive to mask signals from said data processing unit, said mask signals providing a predetermined combination of said group of logic signals from said data processing unit and said group of memory logic signals forming said new group of logic signals in said circuit means, a presence of less than all of said mask signals activating said gate means for said second interval.

7. The memory module of claim 6, wherein said timing means is responsive to said second signal generating means, said detection of an error during said "partial-write" operation activating said gate means for said third interval, wherein said activation of said gate means for said third interval disables said gate means for said second interval.

8. In a memory module associated with a central processing unit (CPU), said memory module containing error-correcting code (ECC) apparatus for generating signal groups derived from data groups to be stored in memory elements of said memory module, said signal groups being stored alongside said data groups in memory elements for locating errors upon withdrawal of said data groups from said memory elements, a method for providing an operation-dependent interval of time for each memory module operation in said memory module comprising the steps of:

a. initiating a memory module operation in response to command signals from said CPU;

b. generating a control signal from a clock circuit substantially simultaneously with said initiation of said memory module operation, said control signal signaling non-availability of said memory module to said CPU, said control signal applied to an input terminal of said clock circuit for disabling said clock circuit from further activity;

c. removing said control signal after a first interval when said memory operation is a "read" operation;

d. removing said control signal after said first interval when said memory operation is a "write" operation, said "write" operation occurring when said data group to be stored in said memory elements is delivered to said memory module; and e. removing said control signal after a second time interval when said memory operation is a "partial-write" operation, said "partial-write" operation occurring when a portion of a data group stored in said memory elements is to be replaced by incoming data.

9. The method for an operation-dependent interval of time for memory module operation of claim 8, wherein removing of said control signal after a second time interval of step e occurs when said data group stored in said memory elements contains no error detachable by said ECC apparatus, and further including the step of:

f. removing said control signal after a third interval when said data group stored in said memory elements contains an error detectable by said ECC apparatus.

10. The method of claim 9 further including the step:

g. removing said control signal after said first interval when said memory operation is a "refresh" operation, said "refresh" operation for restoring said physical or electrical states which are analog representations of logic data stored in said memory elements.

11. In combination with an electronic data processing unit, an improved memory module having storage apparatus, wherein the improvement comprises:

error-correcting code (ECC) equipment for generating signal groups derived from data groups to be stored in said memory module storage apparatus;

timing apparatus responsive to said error-correcting code equipment generated signal groups and to each operation to be performed in said memory module, said timing apparatus employed for preventing use of said memory module only for an interval of time necessary to complete the current operation to be performed.

12. The memory module of claim 11 wherein said timing means is responsive to command signals from said data processing unit and said ECC equipment, said timing apparatus providing a first interval for a "read" or "write" memory operation in response to a first set of signals from said data processing unit, said timing apparatus providing a second interval and a third interval for a "partial-write" operation in response to command signals from said data processing units, said timing apparatus providing said second interval in response to a first signal from said ECC equipment indicating a stored data group contains no detectable error, said timing apparatus providing said third interval in response to a second signal from said ECC equipment indicating that said stored data group contains a detectable error.

13. In a memory module associated with an electronic data processing unit, said memory module including memory element means for storage of groups of logic signal data and error-correcting code (ECC) apparatus for locating and correcting errors in said data groups stored in said memory element means, a clock circuit for providing three operation-dependent time intervals comprising:

input means for producing an input signal in response to initiation of an operation in said memory module by said data processing unit;

a delay line coupled to said input means, said input signal propagating a timing signal in said delay line, a first logic "AND" gate for receiving input signals including said timing signal applied after a first delay to a first terminal of said delay line and of a first logic control signal;

a second logic "AND" gate for receiving input signals consisting of said timing signals applied after a second time delay to a second terminal of said delay line, of a signal logically complimentary to said first logic control signal and of a second logic control signal;

a third logic "AND" gate for receiving input signals consisting of said timing signal applied after a third time delay to a third terminal of said delay line, of said signal logically complimentary to said first control logic signal, and of a signal logically complimentary to said second control logic signal;

signal generating means coupled to output terminals of said first, said second and said third logic gates, said signal generating means for producing an activity signal occupying one of three time intervals, a particular one of said three time intervals determined by activation of a one of said three logic gates by said delayed input signals; and circuit disabling means coupled to said signal generating means and said input circuit means for disabling said input circuit means from further response to signals from said data processing unit during said activity signal.

14. The clock circuit of claim 13, wherein circuit means derive said first control signal from said data processing unit, said first control signal logically specifying a non-occurrence of a "partial-write" operation, said "partial-write" operation being a replacement of a portion of a specified data group with data from said data processing unit, and wherein said circuit means derive said second control signal from said ECC apparatus, said second control signal logically specifying a non-occurrence of an error in said specified data group.

15. In combination with an electronic data processing unit, a memory module comprising:

input means coupled to said data processing unit, said circuit means for transferring data signal groups to and from said data processing unit;

error-correcting code (ECC) encoding means for generating associated signal groups derived from each of said data signal groups;

memory element means for storing said data signal groups alongside said associated signal groups;

ECC decoding means for locating and correcting errors in a stored data group removed from said memory element means, said location of said errors being derived from said stored data group and a stored associated group; and clock means responsive to said ECC encoding means for signalling to said data processing unit an occurrence of each operation in said memory module, said clock means signal initiated at a beginning of each of said operations by said data processing unit, said clock means signal being present for an interval of time required for completion of each of said operations.

16. The memory module of claim 15 wherein said clock means signal occurs for a first interval of time during a "read" operation in said memory module, wherein said clock means signal occurs for a first interval of time during a "write" operation in said memory module; wherein said clock means signal occurs for a second time interval during a "partial-write" operation in which a portion of selected error-free data group stored in said memory element means is replaced by data from said data processing unit, and wherein said clock means signal occurs for a third time interval during a "partial-write" operation in which a portion of a selected error-containing data group in said memory element means is replaced by data from said data processing unit.

17. The memory module of claim 16 further comprising parity means for comparing data parity calculated for groups delivered by said data processing unit with associated parity bit groups, said parity means generating an associated parity bit group from a selected data group to be delivered to said data processing unit, said associated parity bit group delivered to said data processing unit along with said selected data group.

18. In combination with an electronic data processing unit, a memory module comprising:

storage means for storing data in the form of logic signals;

error-correcting code equipment transfer means for transferring said data logic signals between said storage means and said data processing unit;

control means responsive to signals from said data processing unit for storing a group of said data logic signals at a predetermined location in said storage means, said control means further responsive to signals from said data processing unit for removing a group of said data logic signals from a preselected location in said memory module, said control means responsive to signals from said data processing unit for replacing a portion of a group of said data logic signals at a pre-established location with incoming data logic signals from said data processing unit; and clock means responsive to said error-correcting code equipment transfer means for rendering said memory module unresponsive to said data processing unit until completion of a period of activity by said data processing unit, said period of activity occupying a variable time sufficient for completion of said activity by said memory module.

19. Connected to an electronic data processing unit, an improved memory module for asynchronous working modes relative to said data processing unit, said memory module having storage means, error-correcting code (ECC) apparatus and control circuit means, wherein the improvement comprises;

clock means responsive to said control circuit means of said memory module, for signalling to said data processing unit a non-availability of said memory module during a time interval sufficient for completion of each operation of said memory module.

20. The improved memory module of Claim 19, wherein said clock means signals three operation-dependent time intervals indicating non-availability of said memory module, a first time interval permitting completion of a "read" operation, said first interval also permitting completion of a "write" operation, a second interval permitting completion of a "partial-write" operation in which said ECC apparatus detects no error, and a third interval permitting completion of a "partial-write" operation in which said ECC apparatus detects an error.

* * * * *